W. L. BARTHOLD.
ROUTE REGISTER.
APPLICATION FILED MAR. 10, 1915.
1,180,966.
Patented Apr. 25, 1916.
4 SHEETS—SHEET 3.
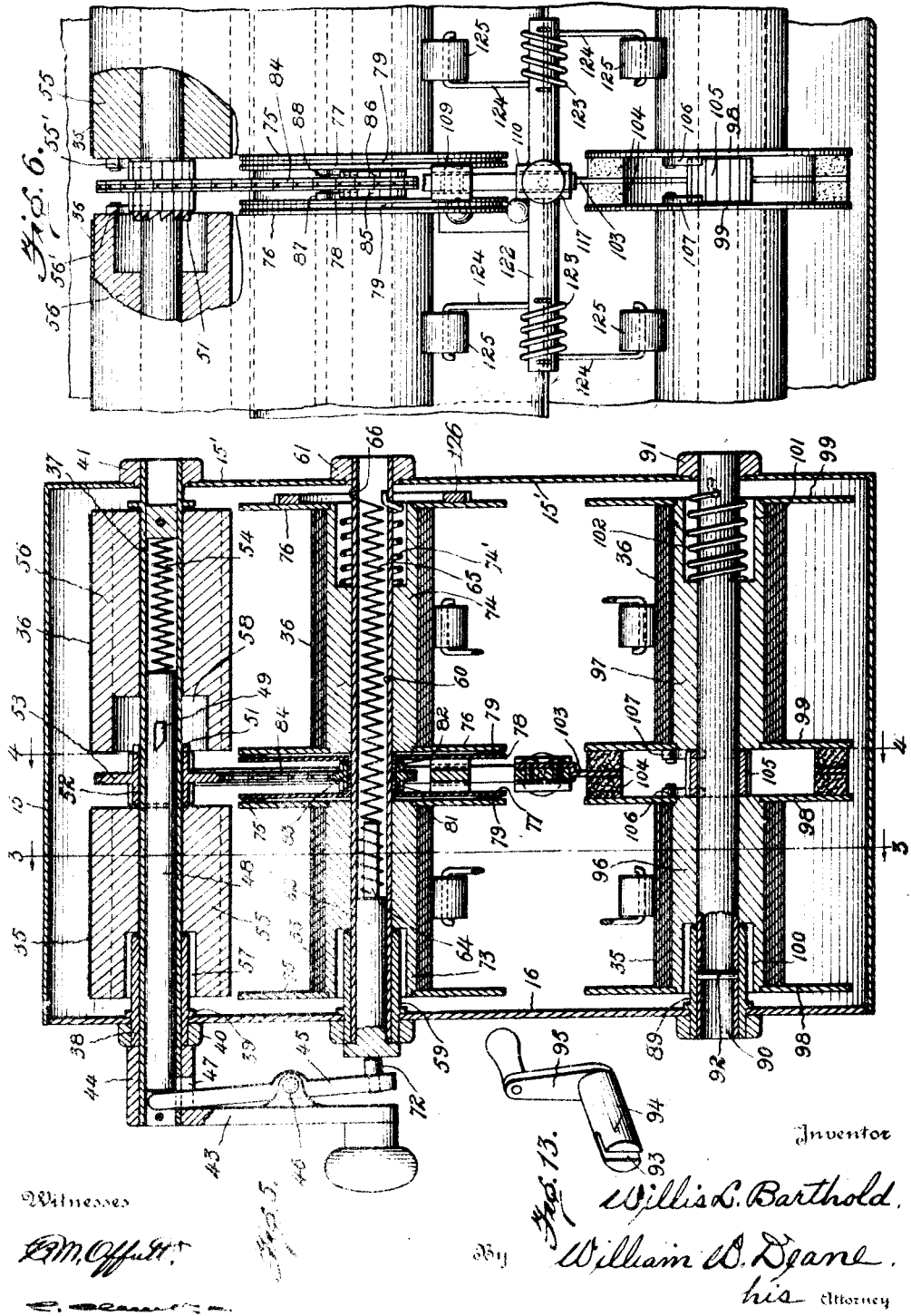

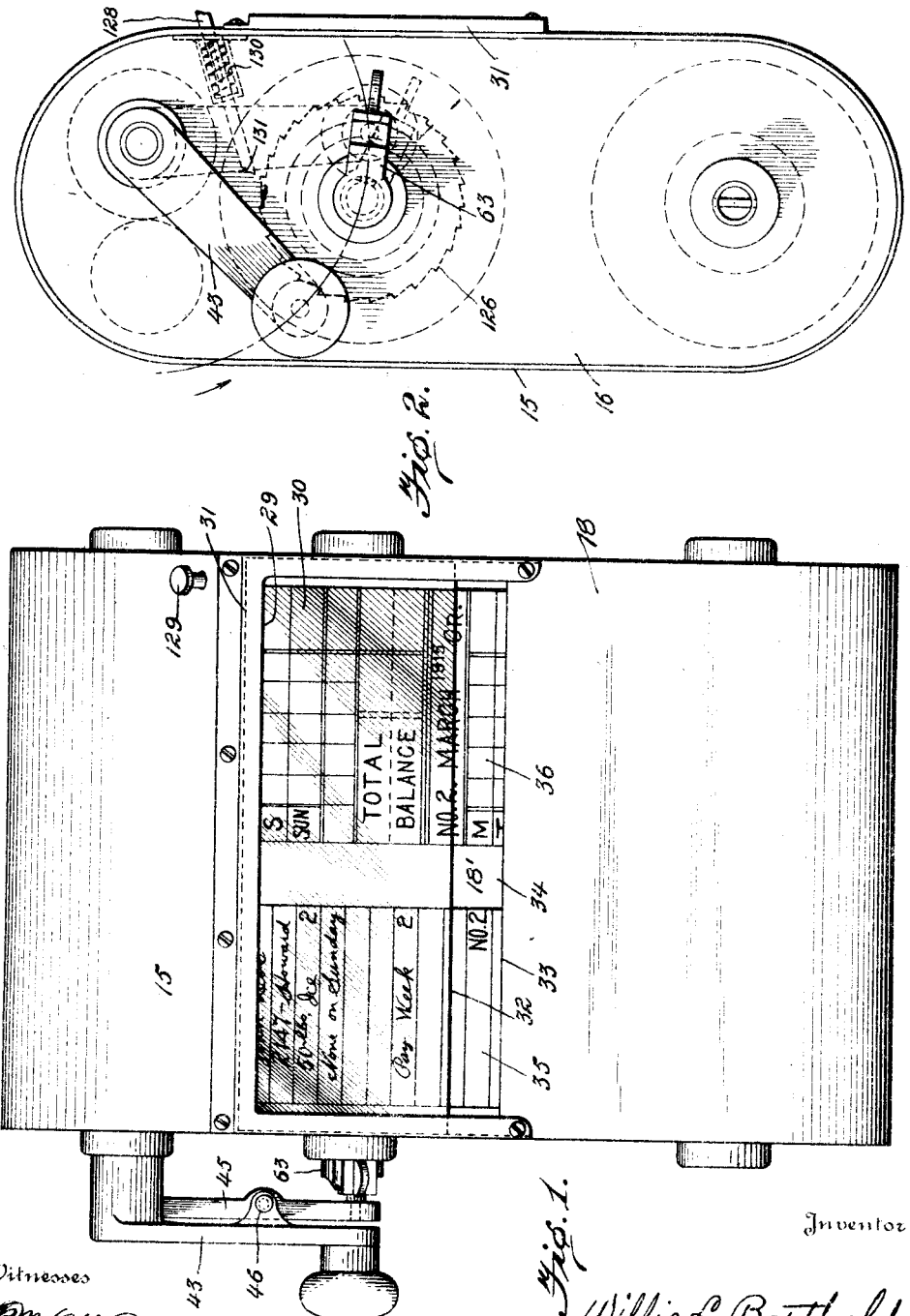

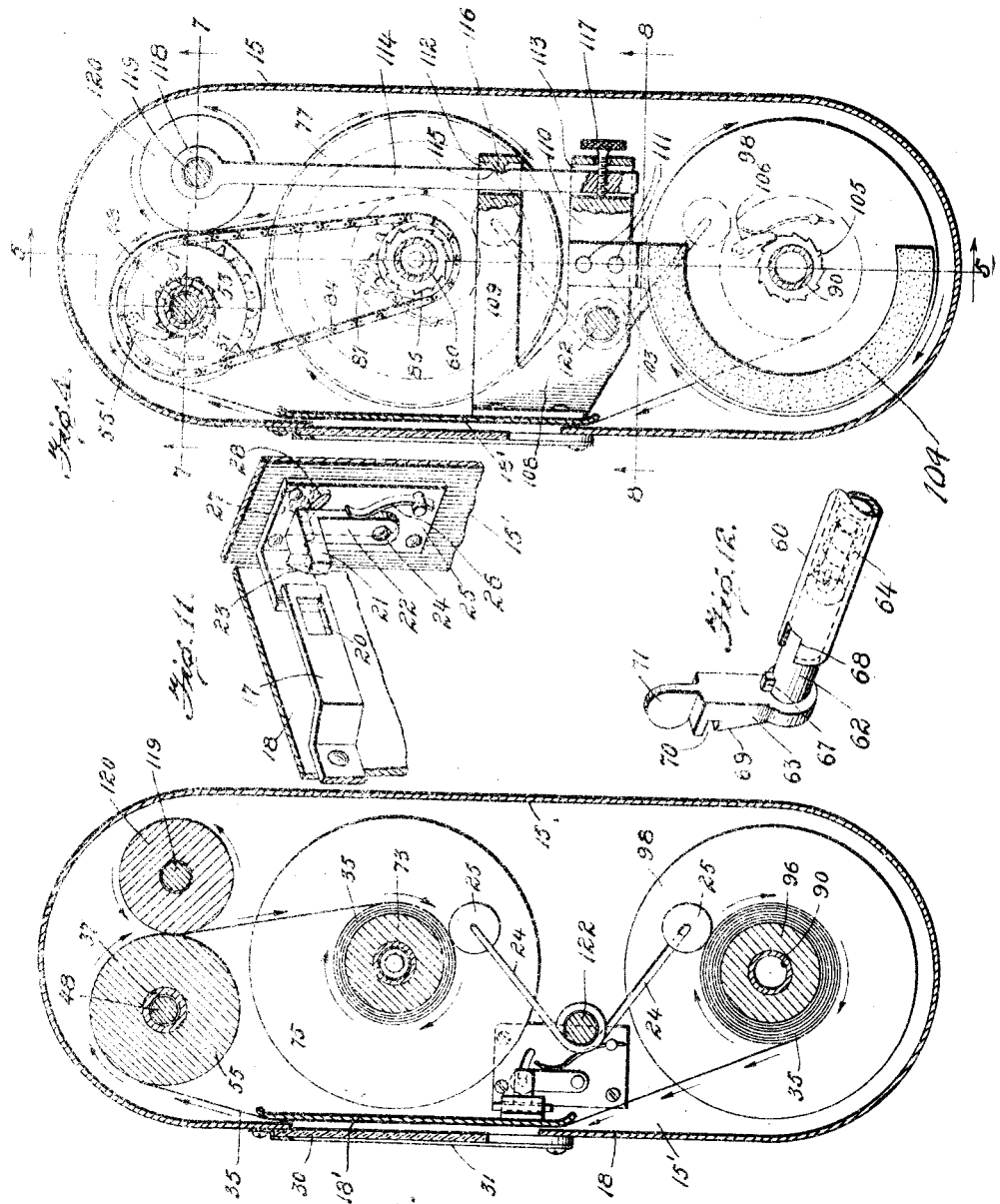

W. L. BARTHOLD.
ROUTE REGISTER.
APPLICATION FILED MAR. 10, 1915.
1,180,966. Patented Apr. 25, 1916.
4 SHEETS—SHEET 4.
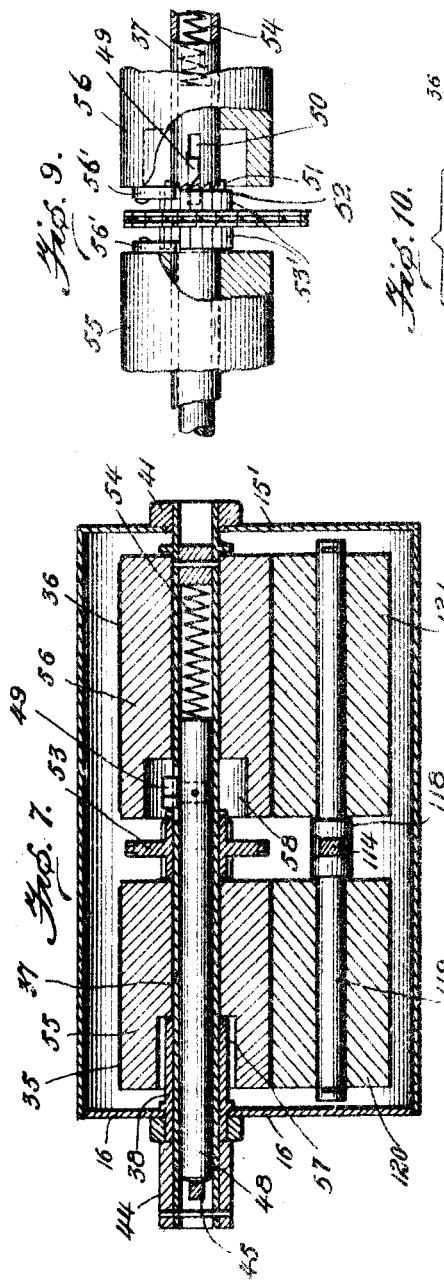
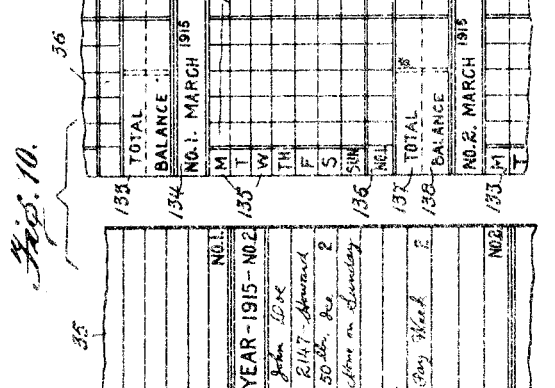
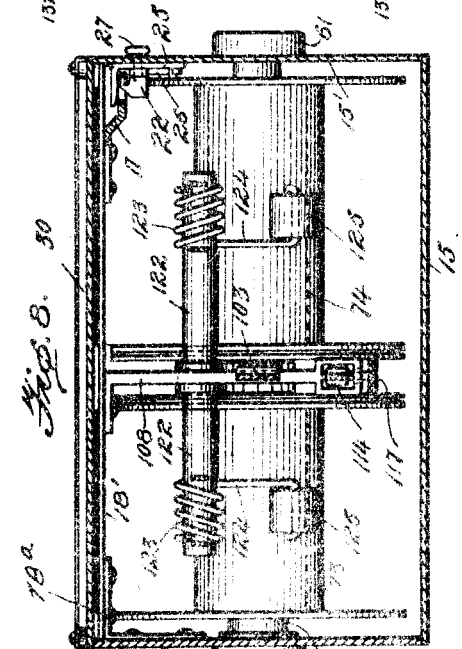
Witnesses
Willis L. Barthold
William W. Deane
his attorney

UNITED STATES PATENT OFFICE.

WILLIS L. BARTHOLD, OF YORK, PENNSYLVANIA.

ROUTE-REGISTER.

1,180,966.   Specification of Letters Patent.   Patented Apr. 25, 1916.

Application filed March 10, 1915. Serial No. 13,387.

*To all whom it may concern:*

Be it known that I, WILLIS L. BARTHOLD, citizen of the United States, residing at York, in the county of York and State of Pennsylvania, have invented certain new and useful Improvements in Route-Registers, of which the following is a specification.

My invention relates to improvements in apparatus for holding and advancing one or more tapes, having suitable data thereon.

An important object of the invention is to provide means of the above mentioned character, whereby the driver of a wagon, automobile or other vehicle, such as a milk man, ice man or the like, upon a route, may conveniently ascertain the amount of goods that each customer wants, and make an accurate record of it.

A further object of the invention is to provide means for normally advancing a plurality of tapes provided with suitable data, so that the data upon one tape will retain a given relation with the data upon the other tape and to advance one tape with relation to the other tape to alter the relation that the data upon such tape has to the data upon the other tape.

A further object of the invention is to provide means to advance the tape or tapes for a given distance and lock the same against further movement until such means are released.

Other objects and advantages of the invention will be apparent during the course of the following description.

In the accompanying drawings forming a part of this specification and in which like numerals are employed to designate like parts throughout the same, Figure 1 is a plan view of apparatus embodying my invention, Fig. 2 is a side elevation of the same, Fig. 3 is a longitudinal sectional view, taken on line 3—3 of Fig. 5, Fig. 4 is a similar view taken on line 4—4 of Fig. 5, Fig. 5 is a horizontal longitudinal sectional view taken on line 5—5 of Fig. 4, Fig. 6 is an enlarged bottom plan view of a plurality of rolls or spools and associated elements, Fig. 7 is a transverse sectional view taken on line 7—7 of Fig. 4, Fig. 8 is a similar view taken on line 8—8 of Fig. 4, Fig. 9 is a detail elevation of clutch mechanism, Fig. 10 is a side elevation of the name and account strips or ribbons, Fig. 11 is a perspective view of a latch mechanism, Fig. 12 is a similar view of a combined trip and lock lever, and, Fig. 13 is a similar view of a rewinding key.

In the drawings, wherein for the purpose of illustration is shown a preferred embodiment of my invention, the numeral 15 designates a casing adapted to be horizontally arranged when in use. This casing may be held in the hand of the operator or may be secured to a stationary part of the wagon or vehicle, as desired. The casing 15 is preferably of an approximately elliptical shape although the precise shape is immaterial. This casing has one side 16 thereof (see Figs. 5, 7 and 8) removable, whereby all of the mechanism arranged within the casing 15 may be removed therefrom and fresh tapes or ribbons applied to the rolls or spools, to be described. Means are provided (see Fig. 11) to lock the side 16 in the closed position with the casing 15, comprising an arm 17, attached to a support-plate 18′ which is rigidly secured to the removable side 16, as shown at 18ª in Fig. 8. The arm 17 is provided with a recess or opening 20, to receive the hooked end 21 of a swinging bolt 22. This hooked end is provided with a cam face 23, adapted to engage with the end of the arm 17, whereby the hooked end 21 will ride over this end and allow the same to enter the opening 20. The bolt 22 is pivotally connected, as shown at 24, with a plate 25, rigidly secured to the inner surface of the stationary side 15′ of the casing. The bolt 22 is normally held in the inner or active position by a leaf spring 26, and a headed pin or stud 27 is attached to the outer end of the bolt 22 and operates through a curved slot 28. The headed stud 27 is arranged exteriorly of the side 15′ and is operated from the exterior thereof. It is thus apparent that when the side 16 is arranged within the casing 15, the locking means securely hold the same in place, and that such locking means may be actuated to permit of the separation of these parts. This locking means when active, also serves to support the unattached end of the support-plate 18′.

As more clearly shown in Figs. 1, 3 and 4, the top 18 of the casing 15 is provided with a sight opening 29, the greater portion of which is preferably covered by a section of glass 30 or other transparent material. This glass is preferably secured to the top 18 by a frame 31 or the like. The lower edge 32 of the glass is spaced a substantial distance from the edge 33 of the opening 29, providing an uncovered opening 34, for a purpose to be more fully described. Beneath the section of glass 30, as more clearly shown in Fig. 3, is the support plate 18', spanning the opening and spaced from the top 18. The function of this plate 18' is to support portions of name and account tapes or ribbons 35 and 36, to be more fully described.

The numeral 37 designates a preferably tubular driving shaft, one end of which is journaled through a bearing 38, extending through an opening in the end of the removable side 16. This bearing has an inner flange 39 and carries a collar 40, rigidly attached thereto, whereby the bearing is rigidly secured to the side 16. The opposite end of the tubular driving shaft 37 is removably journaled within a bearing 41, permanently secured to the closed side 15' of the casing 15. The driving shaft 37 is rotated by a crank 43, having a sleeve 44, rigidly secured to the outer end of the shaft 37. Arranged upon the inner side of the crank 43 is a swinging lever 45, pivotally connected with the crank, as shown at 46. At one end, the lever 45 operates within a slot or slots 47, and projects into the end of the tubular driving shaft 37, for engagement with a reciprocatory lock-shaft or rod 48, as shown. This lock shaft is provided near its inner end and upon its periphery with a clutch element or lug 49, (see more particularly Figs. 5, 7 and 9), operating in a longitudinal slot 50 formed through the tubular driving shaft 37. The clutch element 49 is adapted to be moved into and out of engagement with clutch teeth 51, formed upon or carried by one end of the hub 52 of a sprocket wheel 53. The lock-shaft 48 is moved outwardly by a compressible coil spring 54, as is obvious. It is thus apparent that when the spring 54 moves the lock-shaft 48 outwardly, clutch element 49 will engage with the teeth 51, whereby the sprocket wheel 53 will be locked to the shaft 37, for rotation therewith.

The numerals 55 and 56 designate rolls or spools, engaging respectively the tapes or ribbons 35 and 36 to drive the same, as shown. The roll 55 is provided in one end with a recess 57, for receiving the inner end of the bearing 38, while the roll 56 is provided in one end with a recess 58, receiving the clutch element 49 and the hub of the sprocket wheel 53. The hub 52 is provided with ratchet teeth 53', engaged by spring pressed pawls 56', pivoted to the inner ends of the rolls 55 and 56, as shown.

Arranged upon the side 16 and inwardly of the bearing 38 is a bearing 59, identical in all substantial respects therewith and rigidly attached to the side 16 by identical means. A tubular take-up shaft 60 has one end extending into the bearing 59, and preferably held fast therein, while its opposite end is removably mounted in a bearing 61, secured to the side 15'.

The numeral 62 designates a shank carried by a combined trip and lock lever 63, the shank being rotatable within the tubular shaft 60, and carrying a reduced extension 64, having a torsional coil spring 65 attached thereto, the opposite end of the spring being attached to the tubular shaft 60, as shown at 66. The shank 62 carries a laterally extending stop-lug 67 adapted to be operated in an opening or notch 68, formed in the outer end of the tubular shaft 60, as shown in Fig. 12. The lever 63 is provided with a cam face 69, a transverse groove 70, and a thumb piece 71 attached to the free end of the lever for turning it. The spring 65 normally holds the lever 63 in the position shown in Figs. 1 and 2, whereby it is in the path of travel of an extension or pin 72, carried by the end of the lever 45. When the crank 43 is turned in the direction of the arrow in Fig. 2, the pin 72 rides along the cam surface 69 and enters the slot 70. This moves the corresponding end of the lever 45 outwardly and its opposite end inwardly, which in turn moves the lock-shaft 48 inwardly, whereby clutch element 49 is moved out of engagement with teeth 51, and the sprocket wheel 53 rendered idle upon its shaft 37. The pin 72 being held within the groove 70, the crank 43 is locked against rotation in either direction while the sprocket wheel 53 is idle upon its shaft. To release the crank 43 so that it may be turned for another complete revolution, the combined trip and lock lever 63 is swung upon its pivot, to assume the position indicated in dotted lines in Fig. 2, the extent of movement being regulated by the play that the lug 67 has in the opening or notch 68. This moves the lever 63 out of the path of travel of the pin 72 and the crank may be turned, the lever 63 being released whereby the spring 65 returns the same to the active position, in order that it may again engage and hold the pin 72, for the purpose above stated.

The numerals 73 and 74, designate take-up spools or rolls, which are rotatably mounted upon the shaft 60. The roll 73 is provided with end flanges 75, while the roll 74 has end flanges 76, the flanges being rigidly secured to the rolls. The rolls 73 and 74 are adapted to wind the tapes or ribbons 35 and 36 thereon, as will be more fully explained. Arranged between the inner flanges 75 and 76 are friction disks 77 and 78, provided with rings 79 of friction material, engaging the flanges, as shown. These disks are independently rotably mounted upon the shaft 60 and have hubs 81 and 82 respectively upon which is rotatably mounted a sprocket wheel 83, engaged by a sprocket chain 84, engaging the sprocket wheel 53. The sprocket wheel 82 has its hub portion provided with sets of ratchet teeth 85 and 86, engaged by spring pressed pawls 87 and 88, pivoted to the disks 77 and 78 respectively. It is thus apparent that upon the rotation of the shaft 37 in one direction the same will cause the rotation of the disks 77 and 78, which in turn will drive the spools 73 and 74. The spool 74 has a recess to receive a spring 74', serving to hold the flanges 75 and 76 in proper frictional engagement with the disks 77 and 78.

The numeral 89 designates a bearing, identical in all substantial respects with the bearing 38, and rigidly attached to the side 16 by identically the same means. A tubular carrying shaft 90 is rotatable within the bearing 89 and has its opposite end removably mounted in a bearing 91, secured to the side 15'. The carrying shaft is provided adjacent the bearing 89 with an interiorly arranged transverse pin 92, adapted to fit in a slot 93, formed in the shank 94 of a rewinding key 95, whereby this key may be employed to rotate the shaft 90, for a purpose to be explained. Rotatably mounted upon the carrying shaft 90 are rolls or spools 96 and 97, carrying flanges 98 and 99, rigidly secured thereto. These rolls have the tapes or ribbons 35 and 36 attached thereto, as shown. At one end the roll 96 has a recess 100 to receive the bearing 89 while the roll 97 has a recess 101, to receive a compressible coil spring 102, having one end attached to the shaft 90, as shown. Arranged between the inner flanges 98 and 99 is a relatively stationary brake member 103, carrying friction strips 104, engaging these flanges. The spring 102 forces the flanges 98 and 99 into engagement with the friction members 104 for properly retarding the rotation of the rolls 96 and 97, as is obvious. Rigidly mounted upon the shaft 90 is a ratchet wheel 105, the teeth of which are faced in an opposite direction to the ratchet teeth carried by the sprocket wheels 53 and 83. The teeth of the ratchet wheel 105 are engaged by spring pressed pawls 106 and 107, pivotally secured to the flanges 98 and 99, as shown. It is obvious that the connection between the rolls 96 and 97 and the shaft 90 is such that these rolls may turn with relation to the shaft to permit of the unwinding of the tapes or ribbons 35 and 36, but when the shaft 90 is rotated in a reverse direction by means of the key 95, the rolls 96 and 97 will be locked thereto for rotation therewith.

As more clearly shown in Figs. 4, 6, and 8, the brake member 103 is rigidly secured to a support 108, rigidly attached to the plate support 18'. The support 108 embodies a pair of spaced arms 109 and 110, (see Fig. 4) and the brake member 103 is rigidly attached to the arm 110, as shown at 111. The arms 109 and 110 are provided with transverse openings 112 and 113, respectively, receiving therethrough a lever 114, which may or may not be resilient, as desired. The lever 114 is provided at a point spaced a substantial distance from its ends with a notch 115, to receive a lug or knife edge pivot member 116. At its free end the lever 114 is provided with a screw-threaded opening receiving an adjusting screw 117, having screw-threaded engagement with the arm 110, as shown. At its free end the lever 114 is provided with an apertured head 118, see more particularly Fig. 7, carrying tension rolls 120 and 121, arranged in proximity to the rolls 55 and 56, and engaging the tapes or ribbons carried thereby. It is obvious that by proper manipulation of the bolt 117 the lever 114 may be swung upon its pivot and the rolls 120 and 121 move toward or away from the driving rolls 55 and 56, to correspondingly regulate the frictional engagement between the driving rolls and the tapes or ribbons.

As more clearly shown in Figs. 4 and 8, a shaft 122 is rigidly secured to the arm 110 of the support 108 and extends upon opposite sides of the same for a substantial distance. Coil springs 123 are carried by the outer ends of the shaft 122 and these coil springs have arms 124, carrying rollers 125, arranged in proximity to the rolls 73, 74; and 96, 97, to engage with the tapes or ribbons passing thereabout.

As clearly shown in Fig. 5, a ratchet wheel 126 is rigidly secured to the end of the take-up roll 74 and is adapted to rotate it for a purpose to be described. Secured to the side of the casing 15 in proximity to the ratchet wheel 126 is a reciprocatory plunger 128, having an outer head 129. This plunger is normally held in the outer position by a compressible coil spring 130 and the plunger 128 is provided at its inner end with a beveled face 131, which is normally out of engagement with the teeth of the ratchet wheel 126, but is adapted to be moved into engagement therewith to turn the ratchet wheel.

In Fig. 10 are shown the tapes or ribbons 35 and 36. The name tape or ribbon 35 is divided into transverse sections 132, designated as a whole by "No. 1," "No. 2." Each section 132 is preferably ruled horizontally providing spaces for receiving the year, the name of the customer, his address, the amount of ice or the like to be left, and any other suitable data, such as "No ice on Sunday," and "Pay week" or "Pay weekly." The tape or ribbon 36 is divided into longitudinal sections 133 which are designated as a whole by "No. 1," "No. 2,"

and the like. The longitudinal sections 133 correspond to the longitudinal sections 132, and coöperate therewith in a manner to be more fully explained. Each of the sections 133 is preferably horizontally and vertically ruled, providing a horizontal space 134 for receiving the month and the year. Beneath the horizontal space 134 are horizontal and vertical columns or spaces 135 designated "M," "T," "W," etc., standing for the days of the week. It is thus apparent that each of the horizontal columns is adapted to receive the transaction of a week and there are five of these vertical columns whereby the transactions of a month may be entered upon the section 133. Arranged beneath the foot of these vertical columns is a horizontal space or column 136, for receiving the totals of the vertical columns, the final totals of all of the vertical columns being preferably arranged in the space 137 designated "Total." Below the total space there is a space 138 designated "Balance."

The operation of the apparatus is as follows: In Fig. 1, the "No. 2" sections 132 and 133 of the tapes or ribbons 35 and 36 have advanced so that the columns for "Monday" of the section 133 are beneath the opening 34, while the name of the customer, address, and amount of goods desired appearing upon the corresponding section 132 are arranged beneath the section of glass 30 and may be conveniently read. Assuming that fifty pounds of ice are to be delivered on Monday to John Doe at 2147 Howard, and the goods have been delivered, the driver will place the charge for fifty pounds of ice in the block 139. This having been done the combined trip and lock lever 63 is swung upon its pivot, whereby the crank 43 is released, said crank being turned for a complete revolution in the direction of the arrow until it is again locked in rotation. This movement of the crank rotates the driving rolls 55 and 56, as above indicated. The rotation of these rolls is imparted to the tapes or ribbons 35 and 36, and the rotation of the shaft 60 is imparted to the take-up rolls 73 and 74, as above explained. It is therefore apparent that upon the complete rotation of the crank 43 the tapes 35 and 36 will be wound upon the take-up spools 73 and 74 a sufficient amount to bring the corresponding portion of the succeeding sections 132 and 133 of the tapes or ribbons 35 and 36 into the corresponding position with relation to the opening 29, whereby the driver may ascertain the name of the next customer, the amount of ice or goods to be left, and may make the entry upon the amount sheet after the goods have been delivered. It is thus apparent that this operation is repeated for each customer until the driver has completed his route. Of course the tapes or ribbons may be made in any suitable length in accordance with the number of customers. It is thus apparent that the driver can readily ascertain the desired information concerning all customers to be served on Monday and make the proper entries upon the account sheet for Monday. When the end of the route is reached and all of the customers have been served it is necessary to rewind the tapes or ribbons upon the carrying spools or rolls 96 and 97, which is accomplished by inserting the shank 94 of the key 95 into the end of the tubular shaft 90. The driving and take-up rolls, by virtue of their pawl and ratchet connection with the shafts carrying them, will now rotate with relation to the shafts. When the tapes or ribbons 35 and 36 have been thus rewound upon the carrying rolls or spools, the sections 132 and 133 of the tapes 35 and 36, for the first customer for Monday will again be arranged in the proper position in the opening 29. When the driver goes over his route on Tuesday, it is necessary that he make the entries in the horizontal space 135 designated "T." It is therefore obvious that it is necessary to advance the tape or ribbons 36 with respect to the tape or ribbon 35, so that the "T" space 135 will be arranged beneath the openings 34. This is accomplished by pressing upon the plunger 129, whereby the inner face 131 thereof engages with the teeth of the ratchet wheel 126.

While I have shown and described my invention as used in connection with a plurality of tapes or ribbons, namely one for having the names of the customers and like data and the others for receiving a record of the goods delivered, it is obvious that the apparatus may be used with some degree of success by employing only one tape, such as the account tape.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In apparatus of the character described, a supporting structure, a support-plate carried thereby and adapted to have a tape travel thereover, a tape carrying roll connected with the supporting structure and arranged near the support-plate, a driving roll connected with the supporting structure and arranged near the support-plate and adapted to effect the longitudinal travel of the tape, a take-up roll connected with the supporting structure and arranged near the driving roll to receive the tape thereon, a driving shaft to turn the driving roll, a crank connected with the shaft to turn it, a lever pivotally connected with the crank and provided near its outer end with an extension, and a movable lock lever normally disposed in the path of travel of the extension and having means to receive the extension for holding it against movement.

2. In apparatus of the character described, a supporting structure, a support-plate carried thereby and adapted to have a tape travel thereover, a tape carrying roll connected with the supporting structure and arranged near the support-plate, a take-up roll connected with the supporting structure and arranged near the support-plate, a driving shaft connected with the supporting structure and arranged near the support-plate, a driving roll rotatably mounted upon the shaft, means for connecting the roll with the shaft for rotation therewith including a clutch element, a longitudinally movable rod arranged near the shaft and provided with a co-acting clutch element to engage the first named clutch element, a manually operated element secured to the outer end of the driving shaft to turn it, a lever pivotally connected with the manually operated element and having one end engaging the longitudinally movable rod, and a trip element normally disposed in the path of travel of the lever to automatically move it for shifting the longitudinally movable rod whereby the driving roll is rendered idle upon its shaft.

3. In apparatus of the character described, a supporting structure, a support-plate carried thereby and adapted to have a tape travel thereover, a tape carrying roll connected with the supporting structure and arranged near the support-plate, a take-up roll connected with the supporting structure and arranged near the support-plate, a tubular driving shaft connected with the supporting structure and arranged near the support-plate, a driving roll rotatably mounted upon the tubular shaft, a manually operated member secured to the driving shaft to turn it, a rod mounted to reciprocate within the tubular shaft and provided with a clutch element, means connected with the member and engaging the rod to move it in one direction, and means for connecting the driving roll with the tubular shaft for rotation therewith embodying a co-acting clutch element adapted to be engaged by the first named clutch element.

4. In apparatus of the character described, a supporting structure, a support-plate connected therewith, a tape carrying roll connected with the supporting structure and arranged near the support-plate, a rotatable tubular driving shaft connected with the supporting structure and arranged near the support-plate, a roll mounted upon the tubular shaft to unwind tape from the tape carrying roll, a manually operated member secured to the tubular shaft for turning it, a lever pivotally connected with the member and provided with a lateral extension, a swinging combined trip and lock element normally disposed in the path of travel of the lateral extension and provided with a cam face and groove, a rod mounted to reciprocate in the tubular driving shaft, a clutch mechanism carried by the driving shaft and operated by the rod, and means connecting the clutch mechanism with the second named roll.

5. In apparatus of the character described, a supporting structure, a support-plate connected therewith and adapted to have a tape travel thereover, a tape carrying roll connected with the supporting structure and arranged near the support-plate, a rotatable driving shaft connected with the supporting structure and arranged near the support-plate, a second roll pivotally mounted upon the driving shaft, a manually operated element connected with the shaft to turn it, a lever pivotally connected with the manually operated element and provided with a lateral extension, a combined trip and lock element normally disposed in the path of travel of the lateral extension and having a cam face and recess, and clutch means for locking the second named roll to the shaft and adapted to be operated upon the movement of the lever.

6. In apparatus of the character described, a casing having an opening, a support-plate arranged beneath the opening and adapted to have a tape travel thereover, a carrying shaft arranged within the casing near the support-plate, a carrying roll pivoted upon the carrying shaft, pawl and ratchet connecting means between the roll and shaft, a rotatable driving shaft mounted within the casing near the support-plate, a driving roll arranged upon the driving shaft, pawl and ratchet means connecting the driving roll with the driving shaft, a take-up rotatable shaft arranged within the casing, a take-up roll pivotally mounted upon the take-up shaft, pawl and ratchet connecting means between the take-up roll and take-up shaft, and driving connecting means between the operating shaft and take-up shaft.

7. In apparatus of the character described, a casing having an opening, a support-plate arranged beneath the opening and adapted to have a tape travel thereover, a carrying shaft arranged within the casing near the support-plate, a carrying roll pivotally mounted upon the carrying shaft, pawl and ratchet connecting means between the roll and shaft, a rotatable driving shaft arranged within the casing near the support-plate, a driving roll arranged upon the driving shaft and adapted to turn with relation thereto, pawl and ratchet means connecting the driving roll with the driving shaft, a take-up rotatable shaft arranged within the casing, a take-up roll pivotally mounted upon the take-up shaft, pawl and ratchet connecting means between the take-up roll and take-up shaft, driving connecting means between the operating shaft and take-up shaft, and separate means to rewind the carrying roll.

8. In apparatus of the character described, a supporting structure, a support-plate connected therewith and adapted to have a tape travel thereover, a tape carrying roll connected with the supporting structure, a take-up roll connected with the supporting structure to receive tape from the carrying roll and advancing the same over the support-plate, a rotatable driving shaft connected with the supporting structure, a gear loosely mounted upon the driving shaft and having a clutch element, means connecting the gear with the take-up roll, a coacting clutch element adapted to engage with the first named clutch element to lock the gear to the driving shaft, and means to automatically move the second named gear out of engagement with the first named gear when the driving shaft is turned for a complete revolution.

In testimony whereof I affix my signature in presence of two witnesses.

WILLIS L. BARTHOLD.

Witnesses:
JOHN C. MANN,
EDWARD J. LOUCKS.